Aug. 20, 1968   S. J. OROSZ   3,397,727
RESILIENT RETAINING RING ASSEMBLY
Filed July 29, 1965
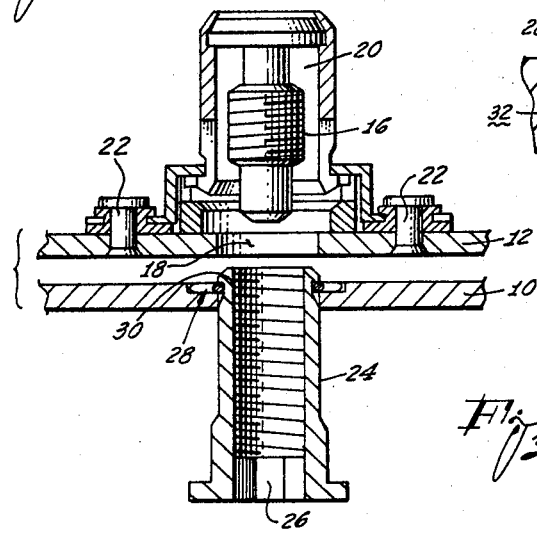
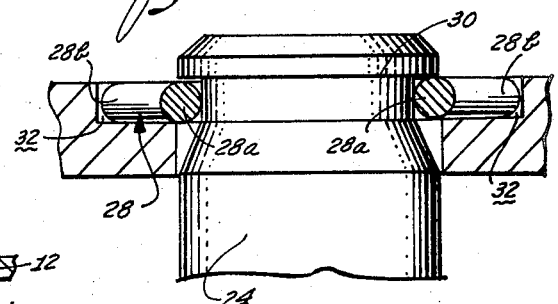
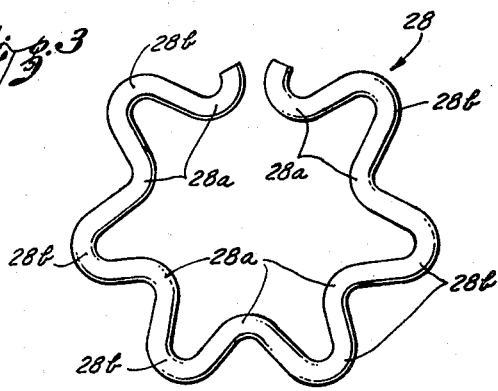
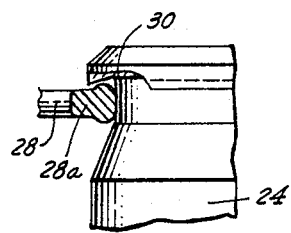
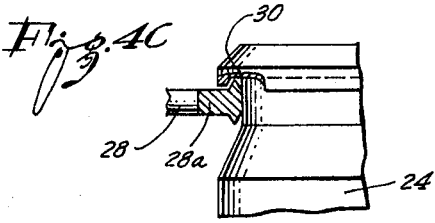
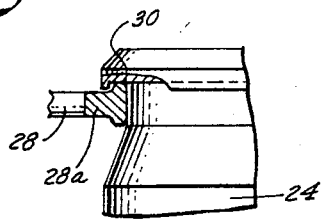
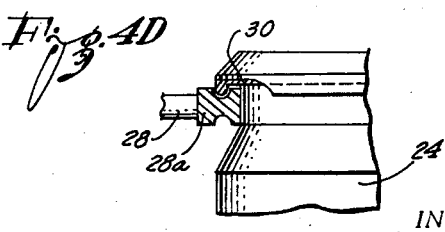
INVENTOR.
Steve J. Orosz
By Keith D. Beecher
Attorneys

United States Patent Office 3,397,727
Patented Aug. 20, 1968

3,397,727
RESILIENT RETAINING RING ASSEMBLY
Steve J. Orosz, 10252 Casanes Ave.,
Downey, Calif. 90241
Filed July 29, 1965, Ser. No. 475,746
3 Claims. (Cl. 151—69)

The present invention relates to fasteners, and it relates more particularly to an improved resilient retaining ring. Although the ring of the invention has particular utility in holding the sleeve nut of an aircraft stressed access panel fastener onto the panel, when the panel is removed from the understructure of the aircraft, it will become evident as the description proceeds that the retaining ring of the invention has general utility in holding two members together.

It is usual in the construction of the air frame of a present day aircraft for the outer skin to carry a portion of the static and aerodynamic load to which the air frame is subjected. It is also common practice to provide a multiplicity of stressed access panels on the air frame. These panels normally cover access openings to the electronic, hydraulic or other controls and equipment of the aircraft.

In order to realize the required structural efficiency, the access panels must also carry their share of the aforesaid loads. Therefore, when one of the access panels is removed, the stress of the understructure is increased, and the understructure shifts slightly as a function of the increased stress. This means that the hole pattern of the understructure which receives the fasteners for the corresponding stressed access panel, shifts with respect to the hole pattern of the panel itself.

It follows that fasteners used in conjunction with such stressed access panels must have sufficient strength to bring the panel and the understructure tightly together, and also they must have sufficiently large tolerances so that they are capable of realigning the holes in the panel and in the understructure when they are tightened into place.

Appropriate fasteners for the above mentioned purpose are known to the art, and they usually comprise externally threaded stud bolts which are mounted to the inner surface of the understructure in alignment under respective ones of the aforesaid holes in the understructure.

The fasteners referred to in the preceding paragraph also comprise an internally threaded sleeve nut which extends through the mating hole in the access panel to be threaded to the stud bolt. The head of the sleeve nut is usually countersunk into the panel. In order to prevent the sleeve nuts from becoming detached from the panel when the panel is removed, it is the common practice to retain the sleeve nuts in the panel by means of a resilient retaining ring. The present invention, as noted above, is particularly concerned with an improved construction for the resilient retaining ring, and with an improved retaining ring/sleeve nut combination. However, as also noted, the ring and combination of the invention has general utility.

The purpose of the aforesaid resilient retaining ring, as explained, is to maintain its threaded sleeve nut on the access panel, or other member, when the nut is disengaged from its corresponding threaded stud. The resilient retaining ring is normally disposed in a recess in the inner side of the access panel. The ring is expanded radially by the outer surface of the sleeve nut when the nut is threaded onto its corresponding stud.

However, when the sleeve nut is removed from its stud, the resilient retaining ring is drawn along the nut and it contracts radially inwardly around a reduced diameter outer peripheral groove on the outer surface of the sleeve nut and engages a shoulder formed by a flange at the inner end of the nut. In this manner, the resilient retaining ring serves to retain the sleeve nut on the access panel, when the panel is removed from the understructure.

Problems have been encountered in the past in devising a resilient retaining ring which will retain its sleeve nut in the access panel in the presence of excessive forces which are often encountered in practice, and which tend to pull the sleeve nut from the panel against the retaining action of the retaining ring.

A generally satisfactory retaining ring which has been used in the past is one which is formed from a resilient wire and which has a generally serpentine configuration. However, even this type of ring has been found to slip from its sleeve nut in some instances and when unusually large forces are encountered during the use of the ring.

In order to provide a retaining ring of the above mentioned type which is capable of withstanding excessive forces without slipping from its sleeve nut, attempts have been made in the past to shape the cross section of the retaining ring. This shaping, for example, has comprised coining the ring so that the cross section of its inner convolutions has a keystone configuration, and which increases in width towards the surface of the associated sleeve nut.

The above mentioned keystone shaping of the prior art resilient retaining ring compensates for an oppositely-directed keystone section of the retaining ring which is formed when the retaining ring is bent into shape. This oppositely-directed keystone section, when it engages the edge of the aforesaid shoulder of the associated sleeve nut, tends to open the retaining ring and cause it to slip over the edge of the flange so as to free the corresponding sleeve nut from the access panel.

Retaining rings constructed in the manner described in the previous paragraph have been generally satisfactory in their operation and have been found to be capable of withstanding relatively high forces without slipping free from their associated sleeve nut. However, these retaining rings have been found to permit the associated sleeve nut to be withdrawn when excessive pull-out forces are encountered during normal use of the fasteners.

The resilient retaining ring of the present invention is constructed to withstand virtually all forces which may be expected to be encountered under all conditions in the mounting and removal of the aforesaid access panels. It has been found, for example, that during the use of the retaining rings of the present invention, there has been considerably less tendency for the associated sleeve nuts to become freed from their access panels.

In the practice of the present invention, the surface of the retaining ring is shaped, rather than its cross section, so that the surface will mate with a complementary shape in the surface of the aforesaid shoulder. This mating is such that any longitudinal force exerted against the sleeve nut causes the shoulder to exert a corresponding force on the retaining ring in a direction to cause the ring to contract radially, rather than to expand. This means that the greater the longitudinal force exerted against the sleeve nut, the tighter the retaining ring is held in place behind the shoulder, and there is no tendency for the ring to slip up over the shoulder.

It is, accordingly, an object of the present invention to provide an improved resilient retaining ring of the type described above, and a retaining ring/sleeve nut combination, which are constructed in a manner securely to lock the nut to the access panel and positively to prevent the nut from being withdrawn from the panel, even in the presence of excessively high forces exerting a pull on the sleeve nut.

Other objects and advantages of the invention will become apparent from a consideration of the following description, when the description is taken in conjunction with the accompanying drawings, in which:

FIGURE 1 is a cross sectional view of a fastener incorporating the concepts of the prior art, and which may include the improved retaining ring and retaining ring/sleeve nut combination of the present invention;

FIGURE 2 is a fragmentary view of a portion of the sleeve nut of the fastener of FIGURE 1, shown on an enlarged scale, and showing a sectional view of a typical retaining ring used in conjunction with the sleeve nut;

FIGURE 3 is a plan view of a typical retaining ring, having a serpentine configuration, also on an enlarged scale; and FIGURES 4A–4D are fragmentary views, partially in section, showing retaining rings and retaining ring/sleeve nut combinations, constructed in accordance with the concepts of the present invention.

The improved resilient retaining ring of the present invention, as mentioned above, and as will be described in more detail subsequently, is constructed so that its surface will mate with the shoulder of its associated sleeve nut, in a manner such that any force tending to pull the sleeve nut through the retaining ring causes the ring to be cammed tighter into place on the periphery of the sleeve nut by a radial contraction of the ring.

As will also be described, both surfaces of the resilient retaining ring are similarly shaped, so as to improve the gripping capability of the ring regardless of which way the ring is introduced into the fastener assembly. This means that there is no need for the person fitting the retaining ring into the assembly to worry about the orientation of the ring.

Although it has been found that resilient retaining rings with a square cross-section are more effective in opposing pull-out forces than rings with a round cross-section, the concepts of the present invention can be applied to any cross-section and serves to increase materially the capability of the resilient retaining ring to withstand pull-out forces.

Rings can be made in accordance with the invention with any desired cross-section, as dictated by production conveniences and economies. The rings are then treated in accordance with the concepts of the invention to increase their ability to withstand pull-out forces far beyond the rings of the prior art, regardless of the particular cross-sectional shape thereof.

The improved resilient retaining ring of the present invention may be used in conjunction with the fastener shown in FIGURE 1 as mentioned above. The fastener of FIGURE 1 is used, together with a multiplicity of similar fasteners, removably to mount a stressed panel 10 of an understructure frame 12. It will be understood, however, that the fasteners can be used to fasten any two members together, as desired.

The fastener includes, for example, an externally threaded stud bolt 16. This bolt is rigidly held in alignment with a hole 18 in the frame 12. The stud is held in position by an appropriate carrier 20, the carrier being riveted to the frame 12 by means, for example, of rivets 22.

An internally threaded sleeve nut 24 extends through a hole in the panel 10 in alignment with the stud bolt 16. The sleeve nut is threaded onto the stud bolt 16 to fasten the panel 10 in place on the frame 12. A tool-receiving cavity 26 is provided at the end of the sleeve nut, this cavity being shaped to receive an appropriate tool which is used to thread the nut onto the bolt 16.

The sleeve nut 24 is retained on the panel 12 after it has been unscrewed from the stud 16, this being accomplished by means of a resilient retaining ring 28. The retaining ring is normally received in a peripheral groove at the inner end of the nut and it bears against a peripheral shoulder 30 formed adjacent the groove.

An annular recess 32 (FIGURE 2) is provided in the inner surface of the panel 10 for receiving the retaining ring 28. When the sleeve nut 24 is tightened onto the stud 16, the ring 28 is expanded outwardly around the nut as it moves relative to the external surface of the nut back out of the aforesaid peripheral groove.

As best shown in FIGURE 3, the usual resilient retaining ring 28 is in the form of a bent wire having a serpentine configuration. The cross-section of the wire in the prior art may be rectangular or round. The particular ring shown in FIGURE 2 has, for example, a round section. As shown in FIGURE 3, the retaining ring 28 has a plurality of inwardly directed convolutions which form nodes 28a. These nodes engage the neck of the sleeve nut 24, as shown in FIGURE 2, when the retaining ring is disposed in the aforesaid annular groove. The ring also has a plurality of outwardly directed convolutions which form nodes 28b.

In accordance with the concepts of the present invention, the surface of the ring 28 which engages the shoulder 30 has a particular shape which mates with a complementary shape in the shoulder itself. The interrelation between the ring and the shoulder is such that when a force is exerted tending to withdraw the sleeve nut 24 from the ring 28, the resulting force between the shoulder and the ring is such that the tendency is for the ring to be cammed radially inwardly into a more positive and tighter fit in the aforesaid annular groove and against the shoulder 30.

For example, as shown in FIGURE 4A, the shoulder 30 has a tapered surface, with the taper extending downwardly toward the outer periphery of the shoulder, as shown in FIGURE 4. Likewise, the ring 28 is shaped with a taper on the surfaces of its inner convolutions 28a, the taper increasing in thickness towards the periphery of the ring, so as to engage the shoulder 30 in the illustrated manner. It is evident that any force exerted against the nut 30 tending to pull it from the ring 28, causes the shoulder 30 to cam the inner convolutions 28a in a manner such as to constrict the radial dimension of the ring, and draw it even tighter against the peripheral groove of the sleeve nut 24.

In the embodiment of FIGURE 4B, the surface of the inner convolution 28a of the ring 28 has a projection as a peripheral ridge which extends out from the plane of the ring and which is engaged by a corresponding channel in the surface of the shoulder 30.

In the embodiment of FIGURE 4C the surface of the inner convolution 28a has an outwardly extending barb-shaped annular projection. The annular barb or ridge on the surface of the inner convolution 28a of the ring 28 in FIGURE 4C engages a similarly shaped annular recess in the surface of the shoulder 30 for the purposes explained above.

It will be appreciated that in all the embodiments, a complementary shape is formed on the opposite surface of each of the inner convolutions 28a. This, as explained above, permits the retaining rings 28 to be inserted into the assembly with either orientation, so as to facilitate the assembly process.

In the embodiment shown in FIGURE 4D, the surface of the shoulder 30 has a peripheral projection having, for example, a semi-circular cross-section. This projection is received in a mating groove in the surface of the inner convolution 28a of the ring 28. The latter embodiment is most advantageous in that it assures a positive lock of the ring on the nut, even when the forces exerted against the nut are at an angle to the plane of the ring.

The invention provides, therefore, an improved resilient retaining ring and retaining ring/sleeve nut combination, whereby the retaining ring serves to retain the nut positively in the associated panel, even in the presence of excessively high forces tending to withdraw the nut from the panel.

While particular embodiments of the invention have been shown and described, modifications may be made.

It is intended in the claims to cover all modifications which fall within the scope of the invention.

What is claimed is:

1. In a fastener for attaching a first member to a second member, said fastener comprising an externally threaded stud bolt to be mounted on said second member, and an internally threaded sleeve nut to be mounted on said first member and to be threadably received by said bolt, said sleeve nut having an external peripheral groove adjacent the inner end thereof defining a shoulder, a resilient retaining ring disposed in said groove to bear against said shoulder, said retaining ring having a serpentine configuration with a plurality of inwardly extending convolutions defining nodes each having a first surface engaging said shoulder, said first surface of each of said inwardly extending convolutions, and the surface thereof opposite to said first surface each being shaped with a taper increasing in thickness towards the inner edge of the retaining ring so as to cause each such surface to extend out from the plane of said retaining ring and into mating relationship with a complementary shape in the surface of said shoulder.

2. In the fastener defined in claim 1, and in which each of said surfaces of said inwardly extending convolutions of said retaining ring is shaped to define a groove to be engaged by a complementary projecting portion in the surface of said shoulder.

3. In the fastener defined in claim 1, and in which said taper of each of said surfaces of said inwardly extending convolutions of said retaining ring forms at least one projection therein extending out from the plane of said ring to engage a corresponding recess in the adjacent surface of said shoulder.

References Cited

UNITED STATES PATENTS

| | | | |
|---|---|---|---|
| 1,750,257 | 3/1930 | Bonnell | 85—8.8 |
| 2,916,787 | 12/1959 | Samuan | 85—8.8 |
| 3,180,388 | 4/1965 | Newcomer et al. | 151—69 |

FOREIGN PATENTS

| | | |
|---|---|---|
| 851,146 | 9/1939 | France. |

MARION PARSONS, Jr., *Primary Examiner.*